UNITED STATES PATENT OFFICE.

DELLE M. PHILLIPS, OF LONG BEACH, CALIFORNIA.

STAINLESS PASTE.

1,384,917.  Specification of Letters Patent.  Patented July 19, 1921.

No Drawing.  Application filed August 21, 1920. Serial No. 405,056.

*To all whom it may concern:*

Be it known that I, DELLE M. PHILLIPS, a citizen of the United States, residing at Long Beach, in the county of Los Angeles and State of California, have invented certain new and useful Improvements in Stainless Pastes, of which the following is a specification.

This invention relates to pastes, and particularly to a paste which will not stain the most delicate fabric and, therefore, can be used for the making of artificial flowers.

The general object of my invention is to provide a paste which can be used in making artificial flowers, for millinery and like purposes, and for use with delicate silks, velvets, etc., without staining them or otherwise marring the beauty of the artificial flowers, silks, velvets, chiffons, etc.

A further object is to form a paste of this character which will be colorless, stainless, adhesive, pliable and durable and which is practically water-proof.

The paste which I have devised for this purpose consists of a body consisting of flour or other starchy material, and preferably consisting of a mixture of rice flour and corn startch, a gum added in order to make the paste more adhesive, a preservative and a water-proofing material, such as aluminum sulfate, glycerin to check the drying qualities of the gum and which prevents the paste from getting hard and stiff, and an oil of such character that it will not stain but which will reduce the tendency of the paste to dry and also, if possible, give a pleasant spicy odor to the paste.

Preferably my improved paste is made according to the following formula:—

| | |
|---|---|
| Boiling water | One pint. |
| Rice flour | One-half pound. |
| Corn starch | One-quarter pound. |
| Gum arabic | One-eighth ounce. |
| Aluminum sulfate | One-quarter ounce. |
| Glycerin | One dram. |
| Oil of cloves | One-quarter dram. |
| Oil of cinnamon | One-quarter dram. |

The rice flour and starch are mixed with enough cold water to make a thin paste. This paste is boiled in boiling water and stirred constantly and cooked over a water bath until it is relatively thick. The paste is then removed from the fire and gum arabic, aluminum sulfate, glycerin, oil of cloves and oil of cinnamon are added thereto and thoroughly mixed therewith. The mass when completed has a pasty consistency, is very adhesive, and will not readily dry out and become brittle, and may be used in collapsible tubes or applied by means of a brush.

As before remarked, this paste is particularly adapted for use in making artificial flowers and for use with delicate silks, velvets, chiffons and other like fabrics, and the paste must not stain or otherwise injure the fabric and must have a certain degree of flexibility. The reasons for using the ingredients as above described are as follows: The rice flour makes a white, adhesive paste which will not turn yellow, as wheat or rye flour would do. The corn starch helps to thicken the flour paste and gives it transparency. A paste formed merely of rice flour and corn starch would not have sufficient adhesiveness. This adhesiveness is secured by adding to the mass the gum arabic, while the addition of the aluminum sulfate makes this gum arabic still more adhesive. Furthermore, this aluminum sulfate acts as a preservative. I am aware that alum itself is used as a preservative, but it is not advisable to use alum in the composition above noted because alum will stain, due to the iron in it while the pure aluminum sulfate will not stain. Again, the aluminum sulfate makes the article practically water-proof, and this is very important. Gum arabic would tend to cause the paste to dry too quickly and, therefore, I add the glycerin, which keeps the paste from drying and hardening unduly when exposed to the air. Also, this glycerin counteracts the stiffness of the paste and thereby keeps the silks and other fabrics, and especially the petals of artificial flowers, pliable. It is also a preservative and gives smoothness to the paste. The oil of cloves and the oil of cinnamon also give smoothness to the paste without oiliness, however, and thereby prevent the staining of delicate articles by the oil, and they are also preservative and are non-driving, and in addition give a pleasant, natural, spicy odor to the flowers.

One-fourth of a part of glycerin to one-half part of gum arabic is ideal, as this amount I find in actual practice checks the drying qualities of the gum without making the paste too moist. The aluminum sulfate should be approximately twice the amount of gum arabic. I do not wish to be limited to the inclusion of all of the ingredients herewith named, nor to the exact proportions stated, nor to the exact materials stated. Thus, in place of the rice flour and corn starch, I may use any finely ground, starchy body, but preferably, however, for the reasons stated, I use the rice flour and corn starch. Neither do I wish to be limited to the use of aluminum sulfate as a preservative, though I preferably use this, nor do I wish to be limited to the use of oil of cloves and oil of cinnamon in this composition, though I believe that it is advisable to use these two oils or one of them.

When the oil of cloves and the oil of cinnamon are omitted in this composition, it is necessary to increase the amount of glycerin, and while the paste may be made entirely from rice flour, that is no corn starch used at all, yet where rice flour alone is used, the proportions of the rice flour given must be almost doubled, in other words instead of using one-half pound of rice flour and one-quarter pound of starch, there should be nearly one pound of rice flour used.

I claim:—

1. A paste including water, a finely ground starchy body, an adhesive gum soluble in the water, pure aluminum sulfate, and glycerin.

2. A paste including water, a finely ground starchy body, gum arabic, pure aluminum sulfate, glycerin, and a volatile drying-retarding oil.

3. A paste including water, rice flour, gum arabic, pure aluminum sulfate, and glycerin.

4. A paste consisting of the following ingredients having the following proportions:—

| | |
|---|---|
| Water | 1 pt. |
| A finely ground starchy body | ¾ lb. |
| An adhesive gum soluble in the water | ⅛ oz. |
| A salt of aluminum | ¼ oz. |
| Glycerin | ½ dr. |

5. A paste consisting of the following ingredients having the following proportions:—

| | |
|---|---|
| Water | 1 pt. |
| A finely ground starchy body | ¾ lb. |
| An adhesive gum soluble in the water | ⅛ oz. |
| A salt of aluminum | ¼ oz. |
| Glycerin | ½ dr. |
| Aromatic oil | ¼ dr. |

6. A paste including a mixture of water, a starchy body, gum arabic and glycerin, a salt of aluminum, there being twice as much gum arabic as there is glycerin.

7. A paste including a mixture of water, a finely ground starchy body, gum arabic, aluminum sulfate, and glycerin, there being twice as much gum arabic as there is glycerin and twice as much aluminum sulfate as there is gum arabic.

8. A paste consisting of the following ingredients having the following proportions:—

| | |
|---|---|
| Water | One pint. |
| Rice flour | One-half pound. |
| Corn starch | One-quarter pound. |
| Gum arabic | One-eighth ounce. |
| Aluminum sulfate | One-quarter ounce. |
| Glycerin | One-half dram. |

9. A paste consisting of the following ingredients having the following proportions:—

| | |
|---|---|
| Water | One pint. |
| Rice flour | One-half pound. |
| Corn starch | One-quarter pound. |
| Gum arabic | One-eighth ounce. |
| Aluminum sulfate | One-quarter ounce. |
| Glycerin | One-half dram. |
| Oil of cloves | One-quarter dram. |
| Oil of cinnamon | One-quarter dram. |

In testimony whereof I hereunto affix my signature.

DELLE M. PHILLIPS.